United States Patent
Lin (10) Patent No.: US 7,693,141 B2
(45) Date of Patent: Apr. 6, 2010

(54) METHOD AND SYSTEM FOR SWITCHING THE STATE OF A TERMINATION IN A MEDIA GATEWAY

(75) Inventor: Yangbo Lin, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 763 days.

(21) Appl. No.: 11/595,768

(22) Filed: Nov. 10, 2006

(65) Prior Publication Data

US 2007/0127450 A1 Jun. 7, 2007

(30) Foreign Application Priority Data

Nov. 11, 2005 (CN) .................. 2005 1 0101368

(51) Int. Cl.
*H04L 12/50* (2006.01)
(52) U.S. Cl. .................. 370/360; 370/386; 370/332; 370/241
(58) Field of Classification Search .................. 370/356, 370/395.52, 352, 252, 254, 392, 238, 492, 370/493, 389, 431, 360, 386, 241, 250, 299; 379/112.01, 35, 32.02, 32.03, 32.04, 32.05, 379/201.01, 213.01, 221.08; 709/224, 223, 709/229, 226, 227, 230; 714/25, 55
See application file for complete search history.

(56) References Cited

U.S. PATENT DOCUMENTS

| | | | | |
|---|---|---|---|---|
| 5,204,955 | A * | 4/1993 | Kagei et al. | 714/55 |
| 6,799,210 | B1 * | 9/2004 | Gentry et al. | 709/223 |
| 7,092,493 | B2 * | 8/2006 | Hou et al. | 379/35 |
| 7,245,589 | B2 * | 7/2007 | Neulist et al. | 370/254 |
| 7,477,647 | B2 * | 1/2009 | Choi et al. | 370/401 |

(Continued)

FOREIGN PATENT DOCUMENTS

CN 1564534 1/2005

(Continued)

OTHER PUBLICATIONS

"Updated Draft of New H.248.1 Annex F ServiceChange Procedures", ITU Study Group 16, TD 37 (WP2/16), Geneva, Jan. 20-30, 2004.

(Continued)

*Primary Examiner*—Jean A Gelin
(74) *Attorney, Agent, or Firm*—Finnegan, Henderson, Farabow, Garrett & Dunner LLP (57) ABSTRACT

A method for switching Termination state in an MG includes: exchanging between an MGC and an MG a ServiceChange request for a Termination in the MG, with a parameter used for instructing the Termination to be in a Test state carried in the request; testing by the MG the Termination according to the parameter. A method for switching the state of a Termination in an MG includes: after a test to a Termination is finished, switching the service state of the Termination to an InService or OutOfService state through exchanging a ServiceChange request for the Termination between an MGC and an MG Systems for switching the state of a Termination in an MG are also disclosed. When an MG or MGC tests a Termination, they can notify each other of the service state of the Termination, thereby simplifying the operations of switching the service state of the Termination.

19 Claims, 5 Drawing Sheets

U.S. PATENT DOCUMENTS

| | | | |
|---|---|---|---|
| 2004/0003092 A1* | 1/2004 | Lehto et al. | 709/227 |
| 2004/0042485 A1* | 3/2004 | Gettala et al. | 370/465 |
| 2005/0038992 A1* | 2/2005 | Pelaez | 713/160 |
| 2006/0099951 A1* | 5/2006 | Park | 455/439 |
| 2006/0153205 A1* | 7/2006 | Belling et al. | 370/401 |

FOREIGN PATENT DOCUMENTS

| | | |
|---|---|---|
| WO | WO2007/054011 | 5/2007 |

OTHER PUBLICATIONS

T. Taylor et al; "Megaco/H.248: A New Standard for Media Gateway Control", Communications Magazine, IEEE vol. 38, Issue 10, Oct. 2000, pp. 124-132.

J. Henrique de Souza Pereira et al; "Development of MGS In A Next Generation Network With Megaco/H.248 Support", 12$^{th}$ IEEE International Conference on vol. 1, Nov. 16-19, 2004 pp. 240-241 vol. 1.

Kevin Boyle; "RE: RE: (Megaco) Service Change and Testing"; IETF Mail Archive, Dec. 12, 2003, pp. 1-3, XP002419417.

B. Madhubabu et al; "Megaco/H.248 Call flow examples"; IETF Internet Draft Draft-IETF-Megaco-Callflows-04. TXT, Nov. 12, 2004 pp. 1-295 XP015022808.

* cited by examiner

METHOD AND SYSTEM FOR SWITCHING THE STATE OF A TERMINATION IN A MEDIA GATEWAY

FIELD OF THE INVENTION

The present invention relates to packet network technology, more particularly, to a method and system for switching the state of a Termination in a Media Gateway.

BACKGROUND OF THE INVENTION

The Next Generation Network (NGN) is a service integrated network which takes a packet network as its bearer network to provide a plurality of services, such as fixed phone and mobile phone voice, data, and video. Media Gateway Controller (MGC) and Media Gateway (MG) are two key components of a packet network. The MG functions as service bearer, that is, transforms media of different access manners into the media suitable to be transmitted in an Internet Protocol (IP) network, for example, a Real-time Transport Protocol (RTP)/Real-time Transport Control Protocol (RTCP) flow, while the MGC functions as call control, by which the separation of call control plane and service bearer plane may be implemented so as to share network resources substantially, simplify device upgrade and service extension, and greatly decrease the cost of development and maintenance.

Figure 1:
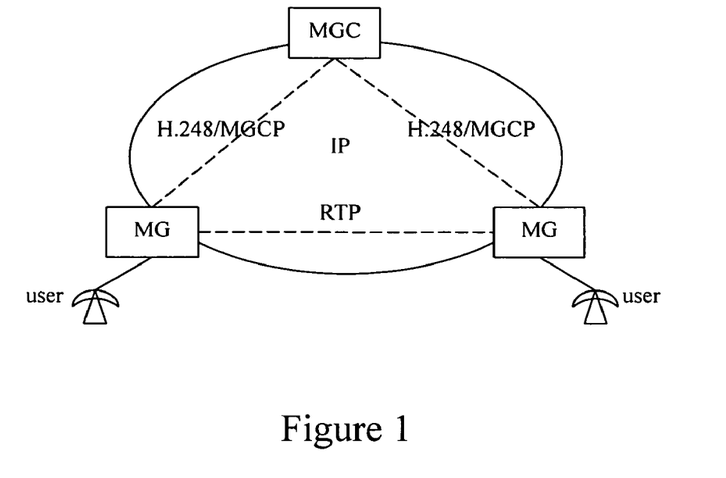
FIG. 1 is a schematic drawing illustrating a networking of an MG and an MGC.

FIG. 1 is a schematic drawing illustrating one common networking of MG and MGC in the prior art. The Media Gateway Control Protocol is the main protocol for the communication between MG and MGC, as shown in FIG. 1, there are two protocols widely employed: Gateway Control Protocol (GCP), for example, H.248/MeGaCo, and Media Gateway Control Protocol (MGCP). Take the H.248 Protocol as an example, various resources in an MG may be denoted by Terminations abstractly. Terminations are divided into Physical Termination and Ephemeral Termination. The former represents some semi-permanent physical entities, such as a Time Division Multiplex (TDM) channel, while the latter represents some public resources applied when used and released after being used, e.g. an RTP flow. The combination of Terminations is denoted by Context abstractly. The Context may include a plurality of Terminations, and therefore the relationship among a plurality of Terminations in a Context may be represented by Topology. The Termination not associated with other Terminations is included in a special Context called Null Context. The MG establishes and releases a Context according to a command from the MGC. A Context is established when a first Termination is added to the Context and released when the last Termination is deleted from the Context.

According to the abstract model of the protocol, call connecting is actually a series of operations on Terminations and Contexts. Such operations are performed through exchanging request and response commands between MGC and MG. The types of command include Add, Modify, Subtract, Move, AuditValue, AuditCapabilities, Notify and ServiceChange. Command parameters, also called Descriptor, are classified into Property, Signal, Event and Statistic. The service-related parameters are converged into a Package logically, and the MGCP, through the Package, permits a Termination to have optional Property, Event, Signal and Statistic so as to support Terminations with various characters.

The Add command is used by the MGC to instruct the MG to add a Termination to one Context; one Context will be established when a first termination is added to the Context by using the Add command. The Modify command is used by the MGC to instruct the MG to modify Property, Event and Signal of a Termination. The Subtract command is used by the MGC to instruct the MG to release the connection between a Termination and the Context in which the Termination is located, and in turn, the statistic information related to the Termination is returned by the MG; it means that one Context is deleted when the relationship between the last Termination and the Context is released. The Move command is used by the MGC to instruct the MG to move one Termination from the Context in which the Termination is currently located to another Context; however the Move command can not move one Termination from the Null Context, and can not move one Termination to the Null Context. The AuditValue command is used by the MGC to request the MG for the current value of Property, Signal, Event and Statistic, which are, in turn, returned by the MG to the MGC. The AuditCapabilities command is used by an MGC to request the MG for all the possible values supported by the Termination about the Property, Signal, Event and Statistic, which are in turn returned by the MG to the MGC. The MG may use the Notify command to notify the event occurred in the MG. The ServiceChange command permits the MG to notify the MGC that a Termination or Termination group will be out of a service or restore a service, permits the MGC to indicate a Termination or Termination group that shall be out of a service or restore the service, permits the MG to notify the MGC that the capabilities of the Termination or Termination group have changed, and permits the MGC to hand over the control for the MG to another MGC; where t. The ID parameter of the Termination specifies the Termination which shall be out of a service or restore the service, and the command will act on the entire MG if the Termination ID of Root is adopted.

According to the definition of the ServiceState Property of the TerminationState Descriptor in the H.248 Protocol, the Termination may be in one of the following three service sates: InService, OutOfService and Test. The InService state denotes that the Termination may be used or is being used for normal communication; the OutOfService state denotes that the Termination can not be used for communication; the Test state denotes that the Termination is in Test. The switching between the service states of a Termination is performed by the ServiceChange command (the Termination is switched to the Test state by the Modify command).

There are a series of parameters in the ServiceChange command, e.g. Method, Reason and Delay. The Method parameter may have the values such as Graceful, Forced, Restart, Disconnected, Handoff and Failover. The Graceful indicates that the entire MG or a termination thereof will be out of service after a specific delay; the Forced indicates that the entire MG or a Termination thereof is out of service accidentally; the Restart indicates that the entire MG or a Termination thereof restore the service after a specific delay; the Disconnected indicates that the MG loses the communication with an MGC but restores the communication with the same MGC subsequently; the Handoff indicates that an MGC hands over the control of an MG to another MGC; the Failover indicates that the standby MG will act when the primary MG is disabled, or the MG detects that the primary MGC is disabled and therefore resorts to the control by the standby MGC. The Reason parameter provides further description for the above Method parameter, while the Delay parameter provides the specific delay for the above Method parameter, and other parameters will not be described in detail here.

It can be seen from the above that the service state of a Termination in the MG may be switched by using the ServiceChange command. For example, the MG or MGC can switch the service state of the entire MG or a Termination in the MG to the InService state using the Restart mode of the ServiceChange command; the MG or MGC can switch the service state of the entire MG or a Termination in the MG to the OutOfService state using the Graceful method or the Force method of the ServiceChange command; in addition, the MG; using the Disconnected method of the ServiceChange command, and the MGC and MG, using the Handoff method of ServiceChange command in coordination, may switch the service state of the Termination to the InService state.

SUMMARY OF THE INVENTION

The present invention provides a method and system for switching the state of a Termination in an MG.

A method for switching the state of a Termination in an MG; including:

exchanging, between a Media Gateway Controller (MGC) and an MG controlled by the MGC, a ServiceChange request for a Termination in the MG; carrying a parameter used for instructing the Termination to enter a Test state in the ServiceChange request;

testing, by the MG; the Termination according to the parameter used for instructing the Termination to be in a Test state.

A system for switching the state of a Termination in an MG, including an MGC and an MG controlled by the MGC, wherein the MGC and the MG are adapted for exchanging a ServiceChange request for a Termination in the MG to each other, carrying a parameter used for instructing the Termination to enter a Test state in the ServiceChange request; the MG is adapted for testing the Termination according to the parameter.

The present invention also provides another method and system for switching the state of a Termination in an MG.

A method for switching the state of a Termination in an MG; including: switching the service state of a Termination to an InService or OutOfService state from the Test state directly through exchanging a ServiceChange request for the Termination between an MGC and an MG according to whether the service of the Termination needs to be restored or dropped.

A system for switching the state of a Termination in an MG, including an MGC and an MG controlled by the MGC; the MGC and the MG are adapted to exchanging a ServiceChange request for the Termination after a test to the Termination is finished to switch the service state of the Termination to an InService or OutOfService state according to whether the service of the Termination needs to be restored or dropped.

The implementation of the method and system for switching the state of a Termination in an MG in accordance with embodiments of the present invention may bring following beneficial effects: the MG, when testing the Termination thereof, may notify the MGC conveniently and timely that the state of the Termination has been switched to the Test state to ensure that the records in the MG and the MGC about the service state of the Termination are consistent.

In addition, in accordance with the method and system of embodiments of the present invention, when the test to the Termination is finished, the service state of the Termination is switched to the InService or OutOfService state on demand to avoid redundant state switching, thereby simplifying the operations and making the operations convenient and effective.

DETAILED DESCRIPTION OF THE INVENTION

The present invention is hereinafter described in detail with reference to the accompanying drawings and preferred embodiments. It should be understood that the embodiments described are for use only in explaining this invention and not in limiting the protection scope thereof.

In accordance with embodiments of the present invention, the service state of the Termination is switched to the Test state by extending a value for the parameter of the ServiceChange command, and the records about the service state of the Termination in an MGC and an MG controlled by the MGC is synchronized in time.

Further, in accordance with embodiments of the present invention, the service state of the Termination is switched to the InService or OutOfService state from Test state directly by distinguishing whether the Termination will restore the service or be out of the service when a test to the Termination is finished.

The main process for switching the state of Termination to the Test state will be described hereinafter by two extension methods.

In the first method in accordance with an embodiment of the present invention, the Reason parameter of the ServiceChange command is extended with a value to further describe the Restart method by indicating the reason of the restart is the test to the Termination.

Therefore, the service state of the Termination can be switched to the Test state by using the Restart method of the ServiceChange command while extending a value for the Reason parameter to indicate that the Termination needs to be switched to the Test state. For example, the extended value for the Reason parameter may be named as Testing.

Figure 2:
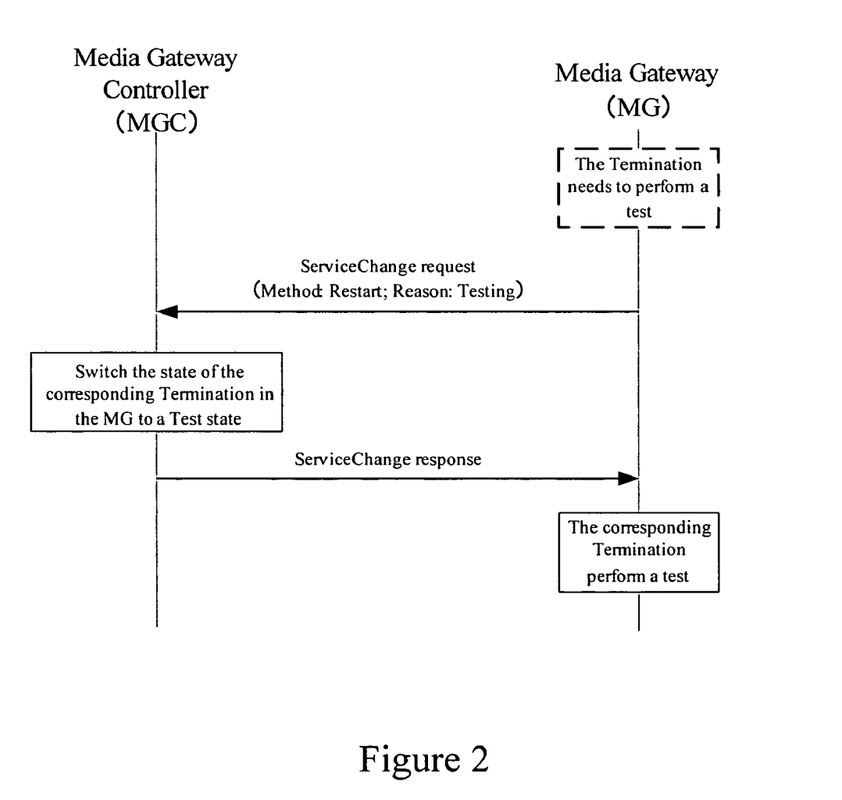
FIG. 2 is a schematic drawing illustrating a process initiated by an MG of switching a Termination to the Test state in accordance with a first embodiment of the present invention.

FIG. 2 is a schematic drawing illustrating a process initiated by an MG of switching a Termination to the Test state in accordance with a first embodiment of the present invention. As shown in FIG. 2, when it is needed to test a (some) Termination(s) in an MG, the MG sends a ServiceChange request for the Termination to the MGC which controls the MG; and the request carries a Method parameter with a value of Restart, a Reason parameter with a value of Testing. Upon receiving the ServiceChange request, the MGC switches the service state of the Termination to the Test state, and sends a ServiceChange response to the MG. Then the MG will start the process of testing the corresponding Termination in the MG.

Figure 3:
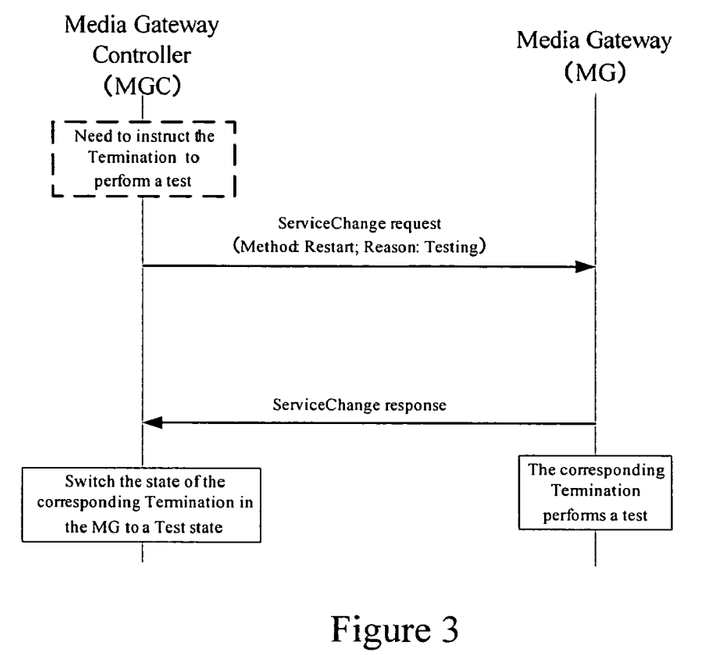
FIG. 3 is a schematic drawing illustrating a process initiated by an MGC of switching a Termination to the Test state in accordance with a second embodiment of the present invention.

FIG. 3 is a schematic drawing illustrating a process initiated by an MGC of switching the Termination to the Test state in accordance with a second embodiment of the present invention. As shown in FIG. 3, when it is needed to instruct the MG to test a (some) Termination(s) in an MG, the MGC sends a ServiceChange request for the Termination to the MG which controls the MG and the request carries a Method parameter with a value of Restart, a Reason parameter with a value of Testing. Upon receiving the ServiceChange request, the MG sends a ServiceChange response to the MGC, and starts the process of testing the corresponding Termination in the MG. Upon receiving the response from the MG, the MGC will switch the service state of the Termination to the Test state.

In the second method in accordance with the present invention, the Method parameter of the ServiceChange command can be extended to have a value indicating directly that the Termination is in Test. For example, the extended value of the Method parameter may be named as Testing.

Figure 4:
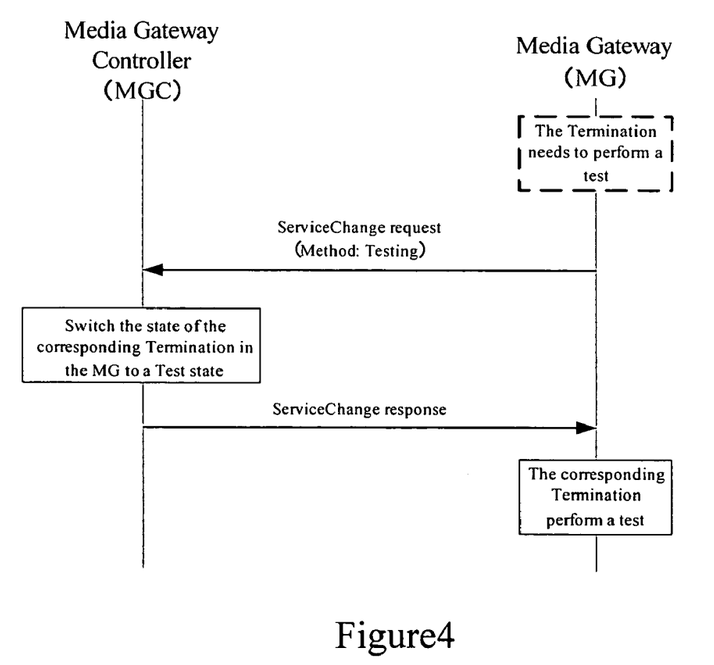
FIG. 4 is a schematic drawing illustrating a process initiated by an MG of switching a Termination to the Test state in accordance with a third embodiment of the present invention.
Figure 5:
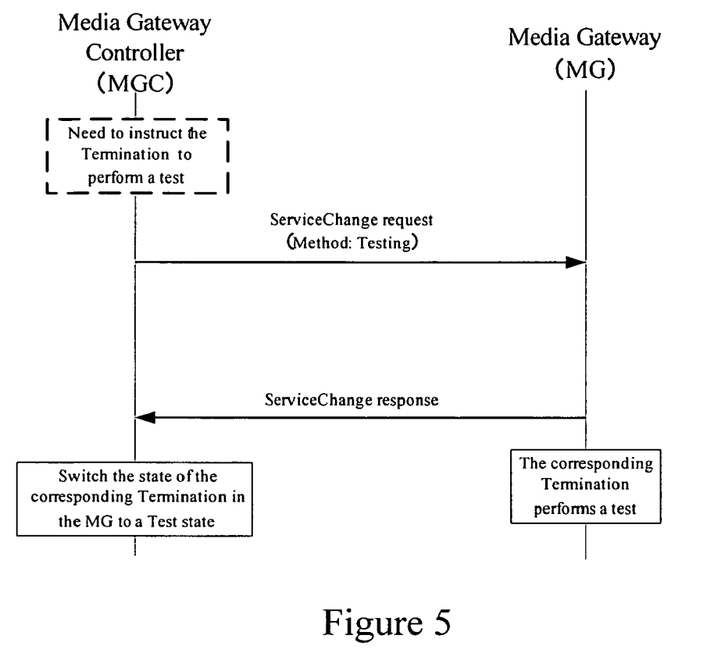
FIG. 5 is a schematic drawing illustrating a process initiated by an MGC of switching a Termination to the Test state in accordance with a fourth embodiment of the present invention.

FIG. 4 is a schematic drawing illustrating a process initiated by an MG of switching the Termination to the Test state in accordance with a third embodiment of the present invention. As shown in FIG. 4, when it is needed to test a (some) Termination(s) in an MG, the MG sends a ServiceChange request for the Termination to the MGC which controls the MG, and the request carries a Method parameter with a value of Testing. Upon receiving the ServiceChange request, the MGC switches the service state of the Termination to the Test state, and sends a ServiceChange response to the MG. Upon receiving the ServiceChange response, the MG will start the process of testing the corresponding Termination in the MG FIG. 5 is a schematic drawing illustrating a process initiated by an MGC of switching the Termination to the Test state in accordance with a fourth embodiment of the present invention. As shown in FIG. 5, when it is needed to instruct the MG to test a (some) Termination(s) in an MG, the MGC sends a ServiceChange request for the Termination to the MG which controls the MG, and the request carries a Method parameter with a value of Testing. Upon receiving the ServiceChange request, the MG sends a ServiceChange response to the MGC, and starts the process of testing the corresponding Termination in the MG at the same time. Upon receiving the response from the MG, the MGC will switch the service state of the Termination to the Test state.

When the test to the Termination is finished, the service state needs to be switched to other service states on different demands. The service state of the Termination can be switched to other service state by extending the protocol.

If the Termination needs to restore the service for normal communication when the test to the Termination is finished, the service state of the Termination can be switched to the InService state by using the Restart method of the ServiceChange command.

Figure 6:
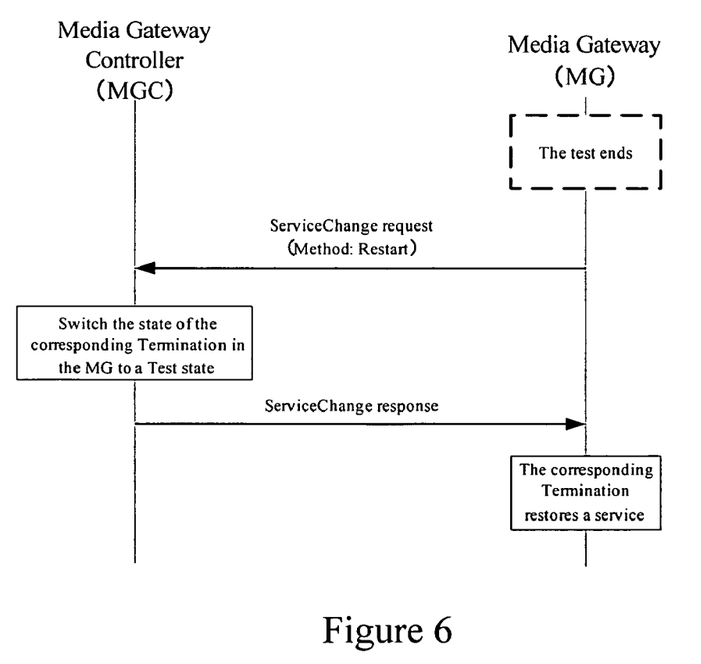
FIG. 6 is a schematic drawing illustrating a process initiated by an MG of switching a Termination from the Test state to the InService state in accordance with a fifth embodiment of the present invention.

FIG. 6 is a schematic drawing illustrating a process initiated by an MG of switching Termination from the Test state to the InService state in accordance with a fifth embodiment of the present invention. As shown in FIG. 6, when the test to the Termination is finished, the MG may send a ServiceChange request for the Termination to the MGC, and the request carries a Method parameter with a value of Restart. Upon receiving the ServiceChange request, the MGC switches the service state of the corresponding Termination in the MG to the InService state, and sends a ServiceChange response to the MG, then the corresponding Termination in the MG will restore the service. Therefore, the MGC and MG can synchronize the records about the service state of the Termination (in service here) in time.

Figure 7:
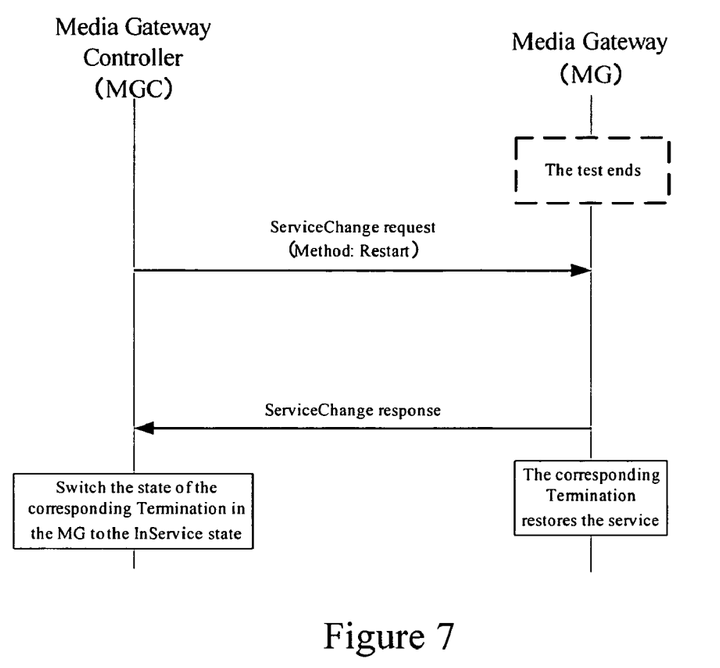
FIG. 7 is a schematic drawing illustrating a process initiated by an MGC of switching a Termination from the Test state to the InService state in accordance with a sixth embodiment of the present invention.

FIG. 7 is a schematic drawing illustrating a process initiated by an MGC of switching Termination from the Test state to the InService state in accordance with a sixth embodiment of the present invention. As shown in FIG. 7, when the test to the Termination is finished, the MGC may send a ServiceChange request for the Termination to the MG, and the request carries a Method parameter with a value of Restart. The MG returns a ServiceChange response to the MGC, and restores the service of the corresponding Termination. Upon receiving the ServiceChange response returned by the MG, the MGC switches the service state of the corresponding Termination in the MG to the InService state. Therefore, the MGC and MG can synchronize the records about the service state of the Termination (in service here) in time.

If the Termination does not need to restore the service when the test to the Termination is finished, the service state of the Termination can be switched to the OutOfService state by using the Graceful method or Forced method of the ServiceChange command.

Figure 8:
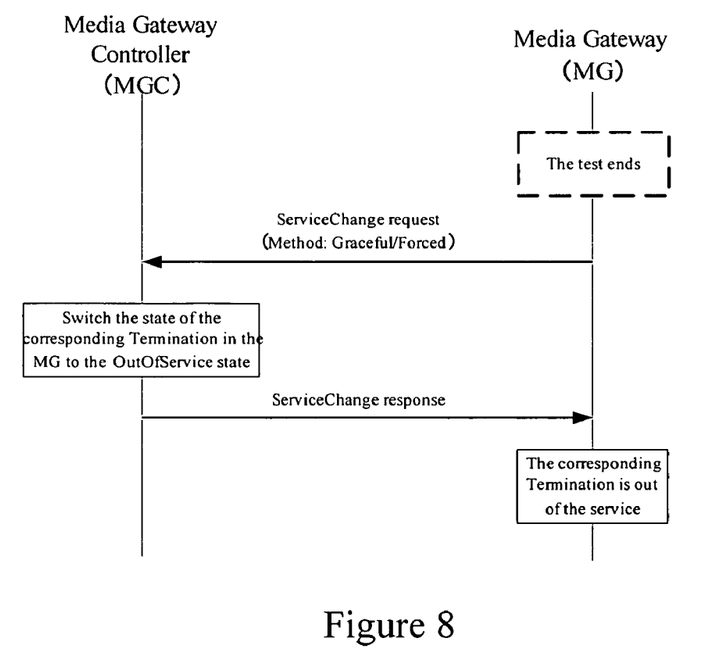
FIG. 8 is a schematic drawing illustrating a process initiated by an MG of switching a Termination from the Test state to the OutOfService state in accordance with a seventh embodiment of the present invention.

FIG. 8 is a schematic drawing illustrating a process initiated by an MG of switching Termination from the Test state to the OutOfService state in accordance with a seventh embodiment of the present invention. As shown in FIG. 8, when the test to the Termination in the MG is finished, the MG may send a ServiceChange request for the Termination to the MGC, and the request carries a Method parameter with a value of Graceful or Forced. Upon receiving the request from the MG, the MGC will switch the service state of the corresponding Termination in the MG to the OutOfService state with delay or without delay, and send a ServiceChange response to the MG and then the corresponding Termination in the MG will be out of the service with delay or without delay.

Figure 9:
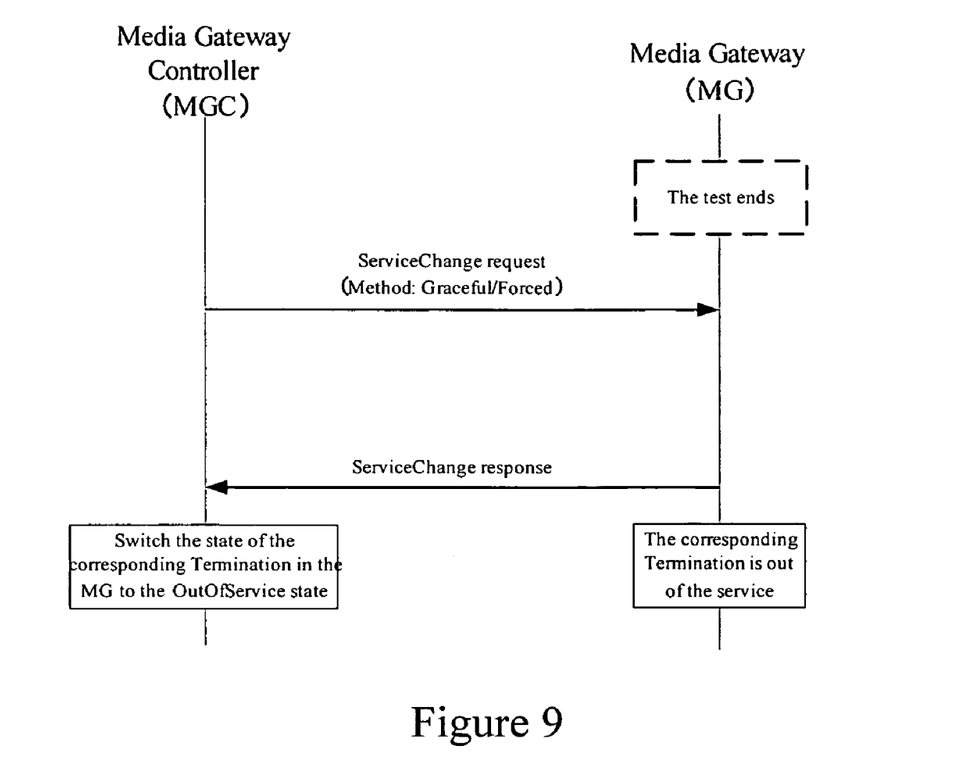
FIG. 9 is a schematic drawing illustrating a process initiated by an MGC of switching a Termination from the Test state to the OutOfService state in accordance with an eighth embodiment of the present invention.

FIG. 9 is a schematic drawing illustrating a process initiated by an MGC of switching Termination from the Test state to the OutOfService state in accordance with an eighth embodiment of the present invention. As shown in FIG. 9, when the test to the Termination in the MG is finished, the MGC may send a ServiceChange request for the Termination to the MG, and the request carries a Method parameter with a value of Graceful or Forced. The MG returns a ServiceChange response to the MGC and then the corresponding Termination will be out of the service with delay or without delay. Upon receiving the ServiceChange response returned by the MG, the MGC will switch the state of the corresponding Termination to the OutOfService state with delay or without delay.

In accordance with the embodiments of the present invention, the service state of a Termination can be switched to the Test state by extending the ServiceChange command, that is, adding a value for a parameter which denote that the Termination of the MG is in Test, and the records of the service state about the corresponding Termination in the MGC and the MC can be synchronized in time. The value of the parameter which denotes that a Termination of the MG is in Test may be a value of the Reason parameter which is added newly in the Restart method of the ServiceChange command or a value of the Method parameter which is added newly in the ServiceChange command. Further, in according with the embodiments of the present invention, the switching method is determined on demand when the test of the Termination is finished, that is, the service state of the Termination is switched from the Test state directly to the InService state by the Restart method of the ServiceChange command, and the service state of the Termination is switched from the Test state directly to the OutOfService state by the Graceful or Forced method of the ServiceChange command.

In accordance with the embodiments of the present invention, when testing a (some) Termination(s), the MG can notify the MGC conveniently and timely that the Termination has been switched to Test state so as to ensure the records about the service state of the Termination in the MG and MGC are consistent. At the same time, in accordance with the embodiments of the present invention, when an MGC instructs an MG to test a (some) Termination, a uniform form of service state switching same as other service state switching of Termination can be adopted. In addition, in accordance with the method and system of the present invention, when the test of a Termination is finished, the service state of the Termination can be switched to the InService or OutOfService state on demand to avoid redundant state switching, thereby making the operation simple, convenient and effective.

The foregoing are only preferred embodiments of the present invention and are not for use in limiting the present invention, any modification, equivalent replacement or improvement made under the spirit and principles of the present invention should be included in the protection scope of the present invention.

What is claimed is:

1. A method for switching a state of a Termination in a Media Gateway (MG), comprising:
   exchanging, between a Media Gateway Controller (MGC) and an MG controlled by the MGC, a ServiceChange request for a Termination in the MG, carrying a parameter used for instructing the Termination to enter a Test state in the ServiceChange request;
   testing, by the MG, the Termination according to the parameter used for instructing the Termination to be in a Test state,
   wherein carrying the parameter used for instructing the Termination to enter the Test state in the ServiceChange request comprises:
      adding a value denoting the Test state for a Reason parameter of the ServiceChange request; and
      setting the value of the Reason parameter of the ServiceChange request for the Termination as the value denoting the Test state, and setting the value of a Method parameter of the ServiceChange request for the Termination as Restart.

2. The method of claim 1, wherein said exchanging the ServiceChange request for the Termination between the MGC and the MG comprises:
   sending, by the MGC, the ServiceChange request for the Termination to the MG;
   sending, by the MG, a ServiceChange response to the MGC upon receiving the ServiceChange request;
   switching, by the MGC, the service state of the Termination to the Test state upon receiving the ServiceChange response.

3. The method of claim 1, wherein said exchanging the ServiceChange request for the Termination between the MGC and the MG comprises:
   sending, by the MG, the ServiceChange request for the Termination to the MGC;
   sending, by the MGC, a ServiceChange response to the MG upon receiving the ServiceChange request;
   switching, by the MGC, the service state of the Termination to the Test state upon receiving the ServiceChange request.

4. The method of claim 1, further comprising:
   after the test to the Termination is finished, switching the service state of the Termination to an InService or OutOfService state from the Test state directly through exchanging the ServiceChange request for the Termination between the MGC and the MG according to whether the service of the Termination needs to be restored or dropped.

5. A method for switching a state of a Termination in a Media Gateway (MG), comprising:
   after a test to a Termination is finished, switching a service state of the Termination to an InService or OutOfService state from a Test state directly through exchanging a ServiceChange request for the Termination between a Media Gateway Controller (MGC) and an MG according to whether the service of the Termination needs to be restored or dropped;
   wherein a Method parameter in the ServiceChange request is set to switch the service state of the Termination to the InService state or OutOfService state.

6. The method of claim 5, wherein said switching the service state of the Termination comprises: when the service of the Termination needs to be restored,
   sending, by the MGC, the ServiceChange request for the Termination to the MG, and setting the value of a Method parameter in the ServiceChange request as Restart;
   sending, by the MG, a ServiceChange response for the Termination to the MGC upon receiving the ServiceChange request for the Termination, and restoring the service of the Termination;
   switching, by the MGC, the service state of the Termination from the Test state to the InService state upon receiving the ServiceChange response for the Termination.

7. The method of claim 5, wherein said switching the service state of the Termination comprises: when the service of the Termination needs to be restored,
   sending, by the MG, the ServiceChange request for the Termination to the MG, and setting the value of a Method parameter in the ServiceChange request as Restart;
   sending, by the MGC, the ServiceChange request for the Termination to the MG, and switching the service state of the Termination from the Test state to the InService state upon receiving the ServiceChange request for the Termination;
   restoring, by the MG, the service of the Termination upon receiving the ServiceChange response for the Termination.

8. The method of claim 5, wherein said switching the service state of a Termination comprises: when the service of the Termination needs to be dropped, sending, by the MGC, the ServiceChange request for the Termination to the MG, and setting the value of a Method parameter in ServiceChange request as Graceful or Forced;

sending, by the MG, a ServiceChange response for the Termination to the MGC, and making the Termination to be out of the service;

switching, by the MGC, the service state of the Termination from the Test state to the OutOfService state upon receiving the ServiceChange response for the Termination.

9. The method of claim 5, wherein said switching the service state of a Termination comprises: when the service of the Termination needs to be dropped, sending, by the MG, the ServiceChange request for the Termination to the MG, and setting the value of a Method parameter in the ServiceChange request as Graceful or Forced;

sending, by the MGC, a ServiceChange response for the Termination to the MG, and switching the service state of the Termination from the Test state to the OutOfService state upon receiving the ServiceChange request for the Termination;

making, by the MG, the Termination to be out of the service upon receiving the ServiceChange response for the Termination.

10. The method of claim 5, wherein said switching the service state of the Termination to the OutOfService state in the MG is performed with delay or without delay.

11. A system for switching the state of a Termination in a Media Gateway (MG), comprising a Media Gateway Controller (MGC) and an MG controlled by the MGC, wherein:

the MGC and the MG are configured to exchange a ServiceChange request for a Termination in the MG to each other, with a parameter used for instructing the Termination to enter a Test state carried in the ServiceChange request;

the MG is adapted to testing the Termination according to the parameter, wherein the Parameter used for instructing the Termination to enter the Test state in the ServiceChange request comprises: a Reason parameter of the ServiceChange request set as a value denoting the Test state, and a Method parameter of the ServiceChange request set as Restart.

12. The system of claim 11, wherein:
the MGC sends a ServiceChange request for the Termination to the MG;
the MG sends a ServiceChange response for the Termination to the MGC;
the MGC switches the service state of the Termination to the Test state upon receiving the ServiceChange response for the Termination.

13. The system of claim 11, wherein:
the MG sends a ServiceChange request for the Termination to the MGC;
the MGC sends a ServiceChange response for the Termination to the MG;
the MGC switches the service state of the Termination to the Test state upon receiving the ServiceChange request for the Termination.

14. The system of claim 11, wherein:
after the test to the Termination is finished, the MGC and the MG exchanges the ServiceChange request for the Termination to switch the service state of the Termination to the InService or OutOfService state according to whether the service of the Termination needs to be restored or dropped.

15. A system for switching a state of a Termination in a Media Gateway (MG), comprising a Media Gateway Controller (MGC) and an MG controlled by the MGC; wherein:
the MGC and the MG are configured to exchange a ServiceChange request for a Termination after a test to the Termination is finished to switch a service state of the Termination to an InService or OutOfService state according to whether the service of the Termination needs to be restored or dropped,
wherein a Method parameter in the ServiceChange request is set to switch the service state of the Termination to the InService state or OutOfService state.

16. The system of claim 15, wherein:
the MGC sends a ServiceChange request for the Termination to the MG, and sets a value of a Method parameter in the ServiceChange request as Restart;
the MG sends a ServiceChange response for the Termination to the MGC, and restoring the service of the Termination upon receiving the ServiceChange request for the Termination;
the MGC switches the service state of the Termination from the Test state to the InService state upon receiving the ServiceChange response for the Termination.

17. The system of claim 15, wherein:
the MG sends the ServiceChange request for the Termination to the MG, and sets a value of a Method parameter in the ServiceChange request as Restart;
the MGC sends a ServiceChange response for the Termination to the MG upon receiving the ServiceChange request for the Termination, and switches the service state of the Termination from the Test state to the InService state;
the MG restores the service of the Termination upon receiving the ServiceChange response for the Termination.

18. The system of claim 15, wherein:
the MGC sends the ServiceChange request for the Termination to the MG, and sets a value of a Method parameter in the ServiceChange request as Graceful or Forced;
the MG sends a ServiceChange response for the Termination to the MGC, and makes the Termination to be out of the service;
the MGC switches the service state of the Termination from the Test state to the OutOfService state upon receiving the ServiceChange response for the Termination.

19. The system of claim 15, wherein:
the MG sends the ServiceChange request for the Termination to the MGC, and sets the value of a Method parameter in the ServiceChange request as Graceful or Forced;
the MGC sends a ServiceChange response for the Termination to the MG upon receiving the ServiceChange request for the Termination, and switches the service state of the Termination from the Test state to the OutOfService state;
the MG makes the Termination to be out of the service upon receiving the ServiceChange response for the Termination.

* * * * *